United States Patent
Yana Motta et al.

(10) Patent No.: US 9,845,419 B2
(45) Date of Patent: *Dec. 19, 2017

(54) LOW GWP HEAT TRANSFER COMPOSITIONS CONTAINING DIFLUOROMETHANE AND 1,3,3,3-TETRAFLUOROPROPENE

(75) Inventors: Samuel F Yana Motta, East Amherst, NY (US); Mark W. Spatz, East Amherst, NY (US); Christopher J Seeton, East Amherst, NY (US); Ryan Hulse, Getzville, NY (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/530,484

(22) Filed: Jun. 22, 2012

(65) Prior Publication Data

US 2013/0020528 A1 Jan. 24, 2013
US 2017/0198184 A9 Jul. 13, 2017

Related U.S. Application Data

(63) Continuation-in-part of application No. 12/511,954, filed on Jul. 29, 2009, now abandoned.

(60) Provisional application No. 61/509,845, filed on Jul. 20, 2011.

(51) Int. Cl.
*C09K 5/04* (2006.01)

(52) U.S. Cl.
CPC ........ *C09K 5/045* (2013.01); *C09K 2205/126* (2013.01); *C09K 2205/22* (2013.01)

(58) Field of Classification Search
CPC .............. C09K 5/045; C09K 2205/126; C09K 2205/22
See application file for complete search history.

(56) References Cited

U.S. PATENT DOCUMENTS

| 7,569,170 B2* | 8/2009 | Minor .............................. 264/53 |
| 8,075,798 B2 | 12/2011 | Rached |
| 2006/0243944 A1* | 11/2006 | Minor et al. .................... 252/67 |
| 2006/0243945 A1 | 11/2006 | Minor et al. |
| 2009/0314015 A1* | 12/2009 | Minor et al. .................... 62/115 |
| 2010/0044619 A1 | 2/2010 | Hulse et al. |
| 2010/0122545 A1 | 5/2010 | Minor et al. |
| 2011/0186772 A1 | 8/2011 | Rached |
| 2012/0056123 A1 | 3/2012 | Rached |
| 2012/0096877 A1 | 4/2012 | Yana Motta et al. |

FOREIGN PATENT DOCUMENTS

| CN | 101864276 A | 10/2010 |
| WO | 2007144623 A1 | 12/2007 |
| WO | 2009/089511 A2 | 7/2009 |

(Continued)

OTHER PUBLICATIONS

R.C. Downing, Fluorocarbon Refrigerants Handbook, Chapter 3, Prentice-Hall, (1988) US.

(Continued)

*Primary Examiner* — John Hardee
(74) *Attorney, Agent, or Firm* — Colleen D. Szuch

(57) ABSTRACT

Heat transfer compositions, methods and use wherein the composition comprising: (a) from about 5 to about 20% by weight of HFC-32 and (b) from about 80% to about 95% by weight of HFO-1234ze.

4 Claims, 1 Drawing Sheet

(56) References Cited

FOREIGN PATENT DOCUMENTS

| WO | 2010119265 A1 | 10/2010 |
| WO | 2010129920 A1 | 11/2010 |
| WO | 2011101617 A2 | 8/2011 |
| WO | 2011161419 A1 | 12/2011 |

OTHER PUBLICATIONS

SAE International, Standard No. J2765, Procedure for Measuring System COP of a Mobile Air Conditioning System on a Test Bench, Oct. 2008, US.
PCT International Search Report, dated Jan. 31, 2013 for, PCT/US2012/045502, filed Jul. 5, 2012.
International Search Report from EP12815041.4 dated Apr. 30, 2015; 3 pages.

* cited by examiner

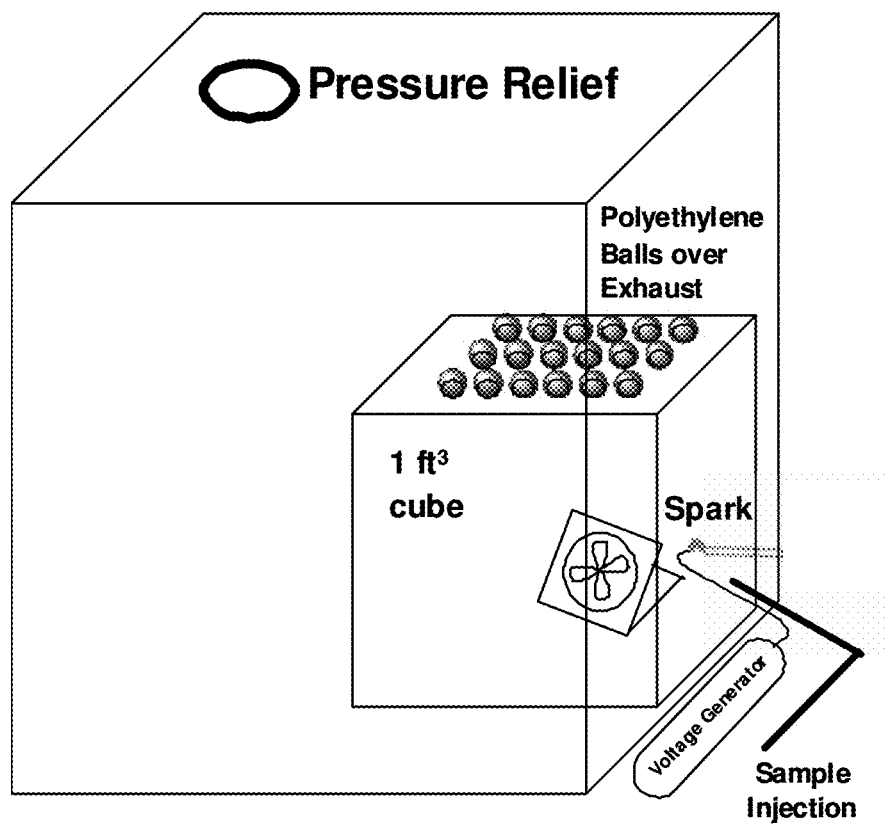

LOW GWP HEAT TRANSFER COMPOSITIONS CONTAINING DIFLUOROMETHANE AND 1,3,3,3-TETRAFLUOROPROPENE

CROSS REFERENCE TO RELATED APPLICATIONS

The present application claims priority to U.S. Provisional Patent Application No. 61/509,845, filed on Jul. 20, 2011, the contents of which are incorporated herein by reference. The present application also claims priority to and is a continuation-in-part of U.S. application Ser. No. 12/511,954 now abandoned, which is also incorporated herein by reference.

FIELD OF THE INVENTION

This invention relates to compositions, methods and systems having utility in numerous applications, including particularly heat transfer systems such as refrigeration systems. In preferred aspects, the present invention is directed to refrigerant compositions particularly well adapted for use in applications in which the refrigerant 1,1,1,2-tetrafluoroethane (HFC-134a) was previously and frequently used, including particularly for heating and/or cooling applications, and to retrofitting refrigerant and/or air conditioning systems, including systems designed for use with HFC-134a.

BACKGROUND

During the course of the past several years, substantial effort has been devoted to developing more environmentally friendly alternatives to materials which had previously been frequently used for refrigeration and air conditioning purposes. During this time, the main refrigerant used for mobile air conditioning (MAC) systems had been HFC-134a. Although HFC-134a possesses many properties that make it attractive for use in MAC systems, it has a relatively high global warming potential (GWP) of about 1430 (100 years).

The fluorinated olefin HFO-1234yf has emerged after much research and development effort by the assignee of the present invention as the material of choice to replace HFC-134a in MAC systems. The emergence of HFO-1234yf as the next-generation material of choice for MAC systems is due primarily to its exceptional ability to provide a combination of difficult to achieve properties, such as excellent heat transfer characteristics, low toxicity, low flammability, and chemical stability, among other properties. Furthermore, HFO-1234yf is capable of providing this combination of properties with little or no need to be blended with other materials.

Prior to and subsequent to the development of HFO-1234yf, much of the effort directed toward next-generation refrigerants was focused on the development of heat transfer compositions comprised of a blend or mixture of two or more components. However, these efforts have thus far been generally less than fully successful because of a failure to fully realize one or more of the myriad of properties required for a successful next generation refrigerant.

The fluorinated olefin 1,3,3,3-tetrafluoropropene (HFO-1234ze) has also been identified in an application assigned to the assignee of the present invention as a next generation refrigerant due to its advantageous combination of properties. See, for example, WO 2009/089511. However, while this application discloses that HFO-1234ze is very attractive as a refrigerant in many applications, it also reveals that it has a substantially lower capacity relative to HFC-134a than does HFO-1234yf in certain air conditioning applications when each is used as the sole refrigerant.

Fluorinated olefin blends, such as those including HFO-1234yf or HFO-1234ze, have been suggested for use in a wide variety of applications, including heat transfer compositions. For example, WO 2009/089511, also discloses blends comprising as a first component one or more fluorinated olefins according to a particular structure and a second component selected from a list of compounds comprising chlorofluorocarbons (CFCs), hydrofluorocarbons (HFCs), water and CO2. However, the specific combination of components in the particular concentration ranges required by the present invention are not disclosed, and no particular combination of these components is identified in WO 2009/089511 as having the advantageous and beneficial properties described herein.

US Application No. 2010/0044619, which is also assigned to the assignee of the present invention, also discloses blends comprising fluorinated olefins for use in connection with heat transfer compositions. This application describes blends comprising as a first component dichloromethane (HFC-32), second component comprising multi-fluorinated olefins having from 2 to 5 carbon atoms, and optionally a third component selected from fluorinated alkanes having to 2 to 3 carbon atoms, CF3I, and combinations of these. According to this application, the second and/or third component of the blend is incorporated for the purpose of acting as of an agent for reducing the flammability of the material relative to HFC-32 alone. Once again, however, the specific combination of components in the particular concentration ranges required by the present invention are not disclosed, and no particular combination of these components is identified in US Application No. 2010/0044619 as having the advantageous and beneficial properties described herein.

Although it is believed that the blends of materials disclosed in the above-noted applications are generally acceptable for use in heat transfer applications under certain circumstances, applicants have found that unexpected yet highly beneficial advantages can be achieved by careful selection of materials within a specific concentration range for forming a heat transfer composition blend which is at once capable of achieving highly desirable and unexpected heat transfer properties, extraordinarily beneficial environmental properties and nonhazardous compositions from the standpoint of combustion ignition.

The burning velocity of a material is one measure that has heretofore been used to assess the hazardousness of the material from a flammability or explosive nature stand point. Thus it has heretofore been considered in many application that a material having a burning velocity below a value of 10 (measured as described hereinafter), is not only important or essential for many applications, but also that such a material would be considered generally a non-hazardous material from a flammability or explosive nature stand point. In this regard it is noted that HFO-1234ze has a burning velocity of about 0, which is nearly the same as the burning velocity of HFC-32, and therefore there would be no real advantage or reason to form a combination of these material according to the above-noted disclosures.

SUMMARY

Applicants have found that heat transfer compositions having highly desirable heat transfer properties (including excellent and unexpectedly peak efficiency (COP)), environmental properties (particularly a GWP of less than about 100) and a low level of hazardousness from the stand point of flammability/combustion impact. More specifically, applicants have found that great but unexpected advantages can be achieved by the use of compositions comprising HFO-1234ze, preferably transHFO-1234ze, in amounts of from greater than about 86% to about 95%, and HFC-32 in amounts of from about 5% to less than about 14% by weight. One unexpected advantage of the preferred aspects of the present invention is that an unexpectedly high peak efficiency occurs with HFC-32 concentrations of less than about 14%. This result is not predicted using current standard simulation techniques and, at present, applicants do not have an explanation for the reason for this result. Applicants have also observed, quite unexpectedly, that the capacity of the compositions tend to not substantially increase for HFC-32 concentrations that are greater than about 14% by weight. This is also an unexpected advantage, especially in stationary systems insofar as excess capacity can cause an overload in electric motors, and especially in automotive air conditioning systems insofar as excess capacity can cause a negative impact on the available power from the car's engine. As used herein unless otherwise indicated, concentrations and weight percentages are based upon the total amount of HFO-1234ze and HFC-32 in the non-lubricant components of the composition. In certain preferred embodiments, the non-lubricant components of the heat transfer composition, sometimes also referred to herein as the refrigerant, consist essentially of HFO-1234ze and HFC-32 in the amounts described herein.

In preferred aspects, the heat transfer compositions, methods, uses and systems of the present invention comprise or utilize a multi-component mixture comprising: (a) from about 86% to about 95% by weight of HFO-1234ze, preferably transHFO-1234ze (also referred to as HFO-1234ze (E)); and (b) from about 5% to less than about 14% by weight of HFC-32, and (c) optionally minor amounts of other components to fine-tune one or more of the properties of the heat transfer composition. Unless otherwise indicated, weight percentages are based upon weight percent based on the total amount of components (a), (b) and (c) present in the composition.

In certain, generally less preferred embodiments in which efficiency is of not such a great concern, the heat transfer compositions, methods, uses and systems of the present invention comprise or utilize a multi-component composition comprising: (a) from about 80% to about 95% by weight of HFO-1234ze, preferably transHFO-1234ze HFO-1234ze and (b) from about 5% to about 20% by weight of HFC-32. In such embodiments, as well as in the more preferred embodiments, applicants have found that the relative amounts of each component (a) and (b) in the composition is effective to provide said composition with a GWP (as hereinafter defined) of not greater than 150, and even more preferably not greater than about 100, while maintaining an ignition hazard level (as hereinafter defined) of not greater than about 5, even more preferably not greater than about 2, and even more preferably of about 0. In such embodiments it is also generally preferred that the composition has a burning velocity (as hereinafter defined) of not greater than about 2.

In certain preferred embodiments, the compositions of the present invention have a relative amount of each component (a)-(c) effective to provide said composition with a capacity relative to HFC-134a under MAC conditions (as hereinafter defined) of from about 90% to about 105%, and even more preferably from about 95% to about 101%, and a COP relative to HDC-134a under MAC condition (as hereinafter defined) for from about 98% to about 102%, more preferably of about 100%.

In certain preferred embodiments, the compositions of the present invention have a relative amount of each component (a)-(c) effective to provide said composition with a Evaporator Glide (as hereinafter defined) of not greater than about 12 and even more preferably not greater than about 10.

In certain highly preferred embodiments, the present invention comprises or utilizes a multi-component composition comprising: (a) HFO-1234ze, preferably transHFO-1234ze; and (b) HFC-32, with the relative amount of each component (a)-(b) in the composition being effective to provide said composition with: (i) a GWP (as hereinafter defined) of not greater than 150, and even more preferably not greater than about 100; (ii) an ignition hazard level (as hereinafter defined) of not greater than about 7, even more preferably not greater than about 5, and even more preferably not greater than about 2; (iii) a capacity relative to HFC-134a under MAC conditions (as hereinafter defined) of from about 90% to about 105%, and even more preferably from about 95% to about 101%; (iv) a COP relative to HFC-134a under MAC condition (as hereinafter defined) for from about 98% to about 102%, more preferably of about 100%; and (v) a Evaporator Glide (as hereinafter defined) of not greater than about 12, and even more preferably not greater than about 10.

The present invention provides also methods and systems which utilize the compositions of the present invention, including methods and systems for heat transfer and for retrofitting existing heat transfer systems. Certain preferred method aspects of the present invention relate to methods of providing cooling in small refrigeration systems. Other method aspects of the present invention provide methods of retrofitting an existing small refrigeration system designed to contain or containing R-134a refrigerant comprising introducing a composition of the present invention into the system without substantial engineering modification of said existing refrigeration system. According to certain highly preferred aspects of the present invention, the refrigeration system and/or refrigeration methods and/or the refrigerant compositions of the present invention are directed to mobile air conditioning systems, and even more preferably automotive air conditioning systems, and even more preferably air-conditioning systems contained in or used in connection with passenger cars.

The term HFO-1234ze is used herein generically to refer to 1,1,1,3-tetrafluoropropene, independent of whether it is the cis- or trans-form. The terms "cisHFO-1234ze" and "transHFO-1234ze" are used herein to describe the cis- and trans-forms of 1, 1, 1, 3-tetrafluoropropene respectively. The term "HFO-1234ze" therefore includes within its scope cisHFO-1234ze, transHFO-1234ze, and all combinations and mixtures of these.

BRIEF DESCRIPTION OF THE FIGURES

FIG. 1 illustrates a schematic depiction of the experimental setup for testing of tubular heaters.

DETAILED DESCRIPTION OF THE INVENTION

Small refrigeration systems are important in many applications, as mentioned above. In such systems, and in automotive air conditioning, one refrigerant which has been commonly used is HFC-134a, which has an estimated Global Warming Potential (GWP) of 1430. Applicants have found that the compositions of the present invention satisfy in an exceptional and unexpected way the need for alternatives and/or replacements for refrigerants in such applications, particularly and preferably HFC-134a, that at once have lower GWP values and provide non-flammable, non-toxic fluids that have a close match in cooling capacity and/or efficiency (and preferably both) to HFC-134a in such systems. Applicants have found that the compositions of the present invention satisfy in an exceptional and unexpected way the need for new compositions, especially for small and medium refrigeration applications, having improved performance with respect to environmental impact while at the same time providing other important performance characteristics, such as capacity, efficiency, flammability and toxicity. In preferred embodiments the present compositions provide alternatives and/or replacements for refrigerants currently used in these applications, including in automobile air conditioning, particularly and preferably HFC-134a, that at once have lower GWP values and provide a refrigerant composition that has a low degree of hazardousness, as defined hereinafter.

Heat Transfer Compositions

The compositions of the present invention are generally adaptable for use in heat transfer applications, that is, as a heating and/or cooling medium, but are particularly well adapted for use, as mentioned above, in low and medium temperature refrigeration systems, and in automotive AC systems, that have heretofore used HFC-134a.

Applicants have found that use of the components of the present invention within the stated ranges is important to achieving the highly advantageous combinations of properties exhibited by the present compositions, particularly in the preferred systems and methods, and that use of these same components but substantially outside of the identified ranges can have a deleterious effect on one or more of the important properties of the compositions of the invention.

As mentioned above, the preferred compositions exhibit a degree of hazard value of not greater than about 5. As used herein, degree of hazardousness is measured by observing the results of a cube test using the composition in question and applying a value to that test as indicated by the guidelines provided in the following table below:

HAZARD VALUE GUIDELINE TABLE

| TEST RESULT | HAZARD VALUE RANGE |
|---|---|
| No ignition. Exemplary of this hazard level are the pure materials R-134a and transHFO-1234ze. | 0 |
| Incomplete burning process and little or no energy imparted to indicator balls and no substantial pressure rise in the cube (all balls rise an amount that is barely observable or not all from the cube holes and essentially no movement of the cube observed). Exemplary of this hazard level is the pure material HFO-1234yf, with a value of 2. | 1-2 |
| Substantially complete burning process and low amount of energy imparted to some of the balls and substantially no pressure rise in the cube (some balls rise an observable small distance and return to the starting position, and essentially no movement of the cube observed). Exemplary of this hazard level is the pure | 3-5 |

-continued

HAZARD VALUE GUIDELINE TABLE

| TEST RESULT | HAZARD VALUE RANGE |
|---|---|
| material R-32, with a value of 4. | |
| Substantially complete burning process and substantial amount of energy imparted to most balls and high pressure rise in the cube but little or no movement of the cube (most balls rise an observable distance and do not return to the top of the cube, but little or no movement of the cube observed). | 6-7 |
| High Hazard Conditions—Rapid burning and substantial imparted to all balls and substantial energy imparted to the cube (substantially all balls rise from the cube and do not return to the starting position, and substantial movement of the cube observed). Exemplary of this hazard level are the pure materials R-152a and R-600a, with values of 8 and 10 respectively. | 8-10 |

The cube test is conducted as indicated in the Examples below. As mentioned above, applicants have found that the compositions of the present invention are capable of achieving a difficult combination of properties, including particularly: low GWP; excellent capacity relative to HFC-134a; excellent efficiency relative to HFC-134a; an evaporator condition glide of less than about 12; and a hazard value of not greater than 7, and preferably of about 3 or less.

The refrigerant compositions of the present invention may be incorporated into heat transfer compositions which include not only the refrigerant having the required and optional components for the refrigerant, but which also includes other components for the purpose of enhancing or providing certain functionality to the composition, or in some cases to reduce the cost of the composition. For example, heat transfer compositions according to the present invention, especially those used in vapor compression systems, include in addition to components (a)-(c) as mentioned above, but also a lubricant, generally in amounts of from about 30 to about 50 percent by weight of the composition, based on the total of the refrigerant composition and the lubricant, and in some cases potentially in amount greater than about 50 percent and other cases in amounts as low as about 5 percent by weight.

Commonly used refrigeration lubricants such as Polyol Esters (POEs) and Poly Alkylene Glycols (PAGs), PAG oils, silicone oil, mineral oil, alkyl benzenes (ABs) and poly (alpha-olefin) (PAO) that are used in refrigeration machinery with hydrofluorocarbon (HFC) refrigerants may be used with the refrigerant compositions of the present invention. Commercially available mineral oils include Witco LP 250 (registered trademark) from Witco, Zerol 300 (registered trademark) from Shrieve Chemical, Sunisco 3GS from Witco, and Calumet R015 from Calumet. Commercially available alkyl benzene lubricants include Zerol 150 (registered trademark). Commercially available esters include neopentyl glycol dipelargonate, which is available as Emery 2917 (registered trademark) and Hatcol 2370 (registered trademark). Other useful esters include phosphate esters, dibasic acid esters, and fluoroesters. In some cases, hydrocarbon based oils are have sufficient solubility with the refrigerant that is comprised of an iodocarbon, the combination of the iodocarbon and the hydrocarbon oil might more stable than other types of lubricant. Such combination may therefore be advantageous. Preferred lubricants include polyalkylene glycols and esters. Polyalkylene glycols are highly preferred in certain embodiments because they are currently in use in particular applications such as mobile air-conditioning. Of course, different mixtures of different types of lubricants may be used.

Heat Transfer Methods and Systems

The present methods, systems and compositions are thus adaptable for use in connection with a wide variety of heat transfer systems in general and refrigeration systems in particular, such as air-conditioning (including both stationary and mobile air conditioning systems), refrigeration, heat-pump systems, and the like. In certain preferred embodiments, the compositions of the present invention are used in refrigeration systems originally designed for use with an HFC refrigerant, such as, for example, R-134a. The preferred compositions of the present invention tend to exhibit many of the desirable characteristics of R-134a but have a GWP that is substantially lower than that of R-134a while at the same time having a capacity and/or efficiency (as measured by COP) that is substantially similar to or substantially matches, and preferably is as high as or higher than R-134a. In particular, applicants have recognized that certain preferred embodiments of the present compositions tend to exhibit relatively low global warming potentials ("GWPs"), preferably less than about 150, and more preferably not greater than about 100, while at the same time achieving a hazard value of less than about 5, and even more preferably of not greater than about 2.

As mentioned above, the present invention achieves exceptional advantage in connection with systems known as low temperature refrigeration systems. As used herein the term "low temperature refrigeration system" refers to vapor compression refrigeration systems which utilize one or more compressors and a condenser temperature of from about 35° C. to about 75° C. In preferred embodiments, the systems have an evaporator temperature of from about 10° C. to about −35° C., with an evaporator temperature preferably of about −10° C. Moreover, in preferred embodiments, the systems have a degree of superheat at evaporator outlet of from about 0° C. to about 10° C., with a degree of superheat at evaporator outlet preferably of from about 4° C. to about 6° C. Furthermore, in preferred embodiments of such systems, the systems have a degree of superheat in the suction line of from about 1° C. to about 15° C., with a degree of superheat in the suction line preferably of from about 5° C. to about 10° C.

Another preferred system of the present invention is referred to herein as a "automotive AC or MAC systems." Such systems have an evaporator temperature of from about 0° C. to about 20° C. and a CT of from about 30° C. to about 95° C. Moreover, in preferred embodiments of such systems, the systems have a degree of superheat at evaporator outlet of from about 2° C. to about 10° C., with a degree of superheat at evaporator outlet preferably of from about 4° C. to about 7° C. Furthermore, in preferred embodiments of such systems, the systems have an increase of temperature in the suction line of from about 0.5° C. to about 5° C., with an increase of temperature in the suction line preferably of from about 1° C. to about 3° C.

As mentioned above, the present invention also achieves exceptional advantage in connection with systems known as medium temperature refrigeration systems. As used herein the term "medium temperature refrigeration system" refers to vapor compression refrigeration systems which utilize one or more compressors and a condenser temperature of from about 35° C. to about 75° C. In preferred embodiments, the systems have an evaporator temperature of from about 10° C. to about −35° C., with an evaporator temperature preferably of about −10° C. Moreover, in preferred embodiments, the systems have a degree of superheat at evaporator outlet of from about 0° C. to about 10° C., with a degree of superheat at evaporator outlet preferably of from about 4° C. to about 6° C. Furthermore, in preferred embodiments, the systems have a degree of superheat in the suction line of from about 1° C. to about 15° C., with a degree of superheat in the suction line preferably of from about 5° C. to about 10° C.

EXAMPLES

The following examples are provided for the purpose of illustrating the present invention but without limiting the scope thereof.

Compositions Tested

The following compositions within the scope of the present invention are the utilized in the examples which follow:

| COMPOSITION DESIGNATION | wt % transHFO-1234ze | Wt % HFC-32 |
|---|---|---|
| A1 | 94 | 6 |
| A2 | 90 | 10 |
| A3 | 86 | 14 |
| A4 | 82 | 18 |
| C1 | 78 | 22 |
| C2 | 74 | 26 |

Example 1: Auto AC Conditions—Experimental Cop and Capacity

This example illustrates the COP and capacity performance of embodiments A1-A3 of the present invention when used as a replacement for HFC-134a in a auto AC refrigerant systems. The coefficient of performance (COP) is a universally accepted measure of refrigerant performance, especially useful in representing the relative thermodynamic efficiency of a refrigerant in a specific heating or cooling cycle involving evaporation or condensation of the refrigerant. In refrigeration engineering, this term expresses the ratio of useful refrigeration to the energy applied by the compressor in compressing the vapor. The capacity of a refrigerant represents the amount of cooling or heating it provides and provides some measure of the capability of a compressor to pump quantities of heat for a given volumetric flow rate of refrigerant. In other words, given a specific compressor, a refrigerant with a higher capacity will deliver more cooling or heating power. One means for estimating COP of a refrigerant at specific operating conditions is from the thermodynamic properties of the refrigerant using standard refrigeration cycle analysis techniques (see for example, R. C. Downing, FLUOROCARBON REFRIGERANTS HANDBOOK, Chapter 3, Prentice-Hall, 1988). and tested in accordance with SAE Standard J2765 OCT2008, Issued 2008 October, a copy of which is attached hereto and incorporated herein by reference. The results for 145, L45, M45, H45, 150, 135, L35, M35, H35 and Charge as defined in SAE Standard J2765 OCT2008 are reported below. The testing reported below began at the lower condenser temperatures but did not produce reportable results at the higher condenser temperature conditions for HFC-32 concentrations of 14% because of difficulty with excessive frost formation, which made the system unstable and difficult to acquire reliable data. Although the condenser temperature conditions described in J2765 are important for the design of MAC systems, the substantial and unexpected deterioration in efficiency at the tested condenser temperatures reported below was sufficient to establish the unexpected result in efficiency peak described herein.

COP (kW/kW)

| | Refrigerant | | | |
|---|---|---|---|---|
| Test Condition | R134a baseline | R32/R1234ze 6%/94% | R32/R1234ze 10%/90% | R32/R1234ze 14%/86% |
| I45 | 2.32 | 2.09 | 2.27 | NA |
| L45 | 1.63 | 1.54 | 1.65 | NA |
| M45 | 1.49 | 1.40 | 1.49 | NA |
| H45 | 1.13 | 1.07 | 1.17 | NA |
| I50 | 2.17 | 2.02 | 2.06 | 1.98 |
| I35 | 3.09 | 2.92 | 3.11 | 2.78 |
| L35 | 2.06 | 2.06 | 2.16 | 1.95 |
| M35 | 1.82 | 1.80 | 1.88 | 1.75 |
| H35 | 1.40 | 1.37 | 1.44 | 1.39 |
| Charge | 2.10 | 2.05 | 2.15 | 2.03 |

* NA—Not Available

Capacity (kW)

| | Refrigerant | | | |
|---|---|---|---|---|
| Test Condition | R134a baseline | R32/R1234ze 6%/94% | R32/R1234ze 10%/90% | R32/R1234ze 14%/86% |
| I45 | 3.01 | 2.40 | 2.72 | NA |
| L45 | 3.88 | 3.30 | 3.62 | NA |
| M45 | 4.44 | 3.74 | 4.12 | NA |
| H45 | 4.76 | 4.03 | 4.47 | NA |
| I50 | 3.14 | 2.59 | 2.74 | 2.90 |
| I35 | 3.84 | 3.17 | 3.57 | 3.56 |
| L35 | 4.95 | 4.39 | 4.78 | 4.77 |
| M35 | 5.58 | 4.98 | 5.31 | 5.39 |
| H35 | 6.12 | 5.43 | 5.71 | 5.99 |
| Charge | 5.91 | 5.15 | 5.56 | 5.68 |

* NA—Not Available

As can be seen from the results reported above, COP peaks at an HFC-32 concentration of above about 10% and below about 14%. This result is contrary to expectations based on using standard refrigeration cycle analysis predictive techniques.

Example 2: Auto AC Conditions—GWP and Hazard Value

By way of non-limiting example, the following Table A illustrates the substantial GWP superiority and hazard avoidance advantage of certain compositions of the present invention, which are described in parenthesis in terms of weight fraction of each component, in comparison to the GWP of HFC-134a, which has a GWP of 1430 and to compositions outside the scope of the present invention (C1 and C2).

TABLE A

| Group | # | Composition | GWP | HAZARD VALUE | BV cm/s |
|---|---|---|---|---|---|
| 32 + 1234ze | A1 | R32/1234ze(E)(0.06/0.94) | 46 | 1 | 0.4 |
| | A2 | R32/1234ze(E)(0.1/0.90) | 73 | 2 | 0.7 |
| | A3 | R32/1234ze(E)(0.14/0.86) | 100 | 2 | 0.9 |
| 32 + 1234ze | A4 | R32/1234ze(E)(0.18/0.82) | 126 | 2 | 1.2 |
| | C1 | R32/1234ze(E)(0.22/0.78) | 153 | 2 | 1.5 |
| | C2 | R32/1234ze(E)(0.26/0.74) | 180 | 2 | 1.7 |

Burning velocity (BV) is determined using standard techniques.

The Hazard Value is determined as described above using the Cube Test. The Cube Test is performed pursuant to the procedure described herein. Specifically, each material being tested is separately released into a transparent cube chamber which has an internal volume of 1 ft3. A low power fan is used to mix components. An electrical spark with enough energy to ignite the test fluids is used. The results of all tests are recorded using a video camera. The cube is filled with the composition being tested so as to ensure a stoichiometric concentration for each refrigerant tested. The fan is used to mix the components. Effort is made to ignite the fluid using the spark generator for 1 min. Record the test using HD camcorder A schematic of the experimental setup for testing of tubular heaters is illustrated in FIG. 1.

What is claimed is:

1. A mobile air conditioning system comprising: at least one compressor, at least one condenser, at least one evaporator and a heat transfer composition comprising a refrigerant comprising: (a) from about 74% to about 90% by weight of transHFO-1234ze and (b) from about 10% to about 26% by weight of HFC-32.

2. The mobile air conditioning system of claim 1 wherein said composition has a GWP of not greater than 150.

3. The mobile air conditioning system of claim 2 wherein said composition is non-flammable.

4. The mobile air conditioning system of claim 1 wherein said composition is non-flammable.

* * * * *